United States Patent [19]
Chang

[11] Patent Number: 5,181,699
[45] Date of Patent: Jan. 26, 1993

[54] IMPACT ABSORBER

[76] Inventor: Chu Chang, No. 165, Sec. 2, Sungkiang Rd., Taitung City, Taiwan

[21] Appl. No.: 849,583

[22] Filed: Mar. 11, 1992

[51] Int. Cl.⁵ .............................................. B60G 13/08
[52] U.S. Cl. .................... 267/221; 267/139; 293/134
[58] Field of Search ............... 267/116, 118, 119, 120, 267/130, 139, 221; 293/107, 132, 134, 135

[56] References Cited
U.S. PATENT DOCUMENTS 3,834,686  9/1974  Montz et al. ..................... 267/139
4,889,374  12/1989  Choun ............................. 267/139

FOREIGN PATENT DOCUMENTS 709089  6/1966  Italy ................................. 293/134

Primary Examiner—Robert J. Oberleitner
Assistant Examiner—Chris Schwartz
Attorney, Agent, or Firm—Fish & Richardson

[57] ABSTRACT

An impact absorber for an automobile bumper comprises a housing and a pair of cylinders arranged in the housing. A third cylinder having two openings at its ends is parallelly disposed between the pair of cylinders such that two gaps are defined by the walls of the pair of cylinders, the third cylinder and the housing. Apertures are formed through the walls of the pair of cylinders facing each other adjacent one end of each of the pair of cylinders for expelling damping liquid from the pair of cylinders into the gaps upon movement of the pistons in the pair of cylinders for damping the impact force. The pressure of damping liquid in the gaps forces two pistons within the third cylinder to move toward each other thereby compressing a coil spring mounted between the two pistons for further damping the impact force. The compressed air between the two pistons within the third cylinder escapes from an aperture formed through the walls of the third cylinder and the housing.

3 Claims, 2 Drawing Sheets

# IMPACT ABSORBER

BACKGROUND OF THE INVENTION

The present invention relates generally to improvements in impact absorbers utilizing damping liquid and spring means for a bumper for vehicles such as cars, buses, trucks and the like.

An impact absorber including cylinders and spring means is already known in this field. Such an impact absorber has several drawbacks, e.g. the impact can not be successively and smoothly damped, the manufacture of the impact absorber is very difficult, and there is a tendency for the impact absorber to act as a spring imparting a potentially harmful rebound effect following impact.

SUMMARY OF THE INVENTION

Accordingly, it is an object of the present invention to provide an improved impact absorber for eliminating the above described drawbacks of the known device.

It is another object of the present invention to provide an improved impact absorber capable of successively and smoothly reducing the impact.

It is still another object of the present invention to provide an improved impact absorber which is easy to manufacture and is simple in construction.

These and other objects and features of this invention will become more apparent from the following description taken in conjunction with the accompanying drawings in which:

FIG. 1 is a longitudinal cross sectional view of three sets of the impact absorbers parallelly arranged in a frame which is mounted on a chassis member of a vehicle; and FIG. 2 is a longitudinal cross sectional view of the impact absorber in an enlarged scale.

DETAILED DESCRIPTION OF THE PREFERRED EMBODIMENT

Figure 1:
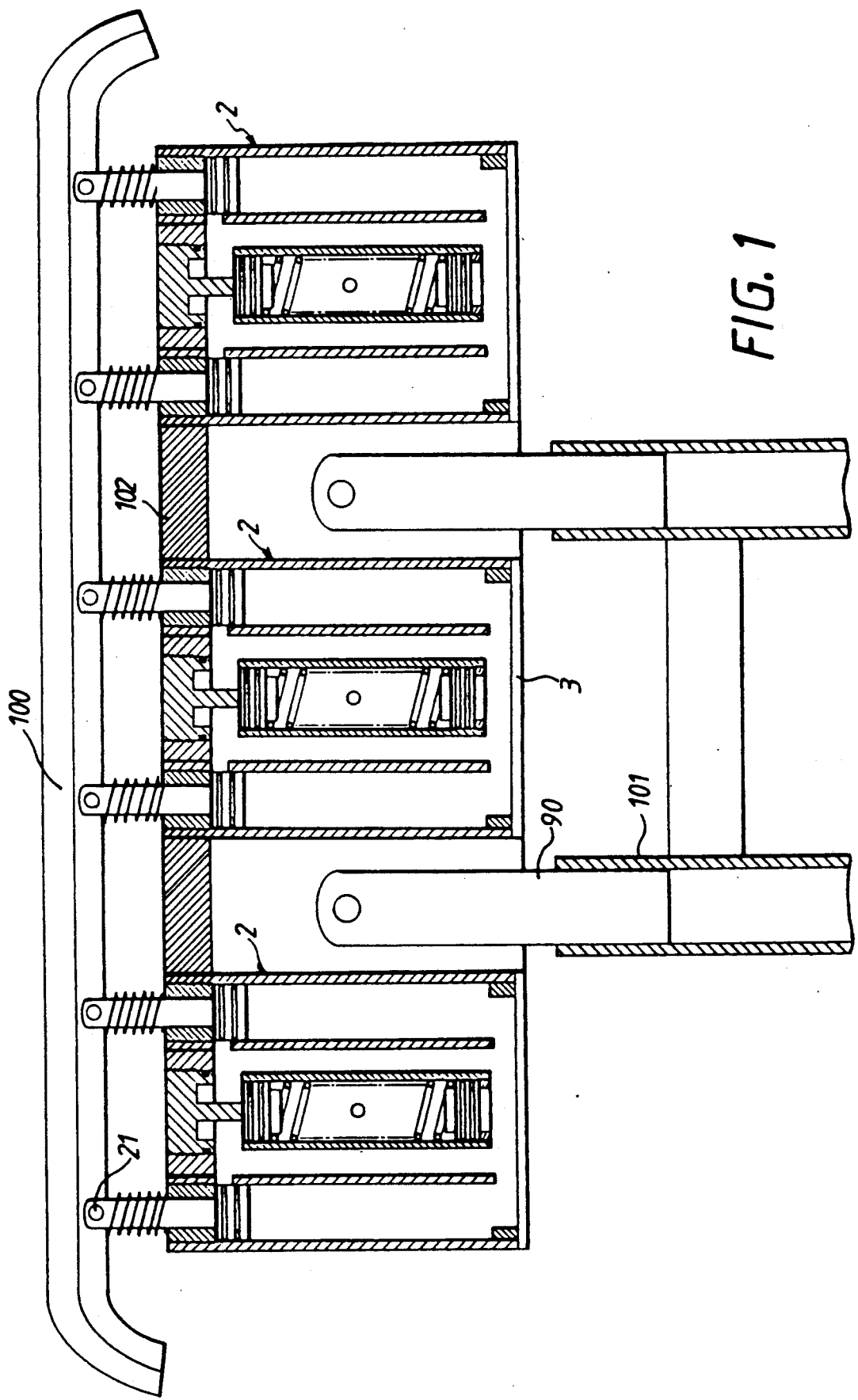

Referring to FIG. 1, there is shown a vehicle bumper 100 coupled by a plurality of bolts 21 to three set of impact absorbers 2. These impact absorbers 2 are parallelly, fixedly arranged in a frame 102 which is mounted on a chassis member 101 of a vehicle by means of a connecting bar 90.

Figure 2:
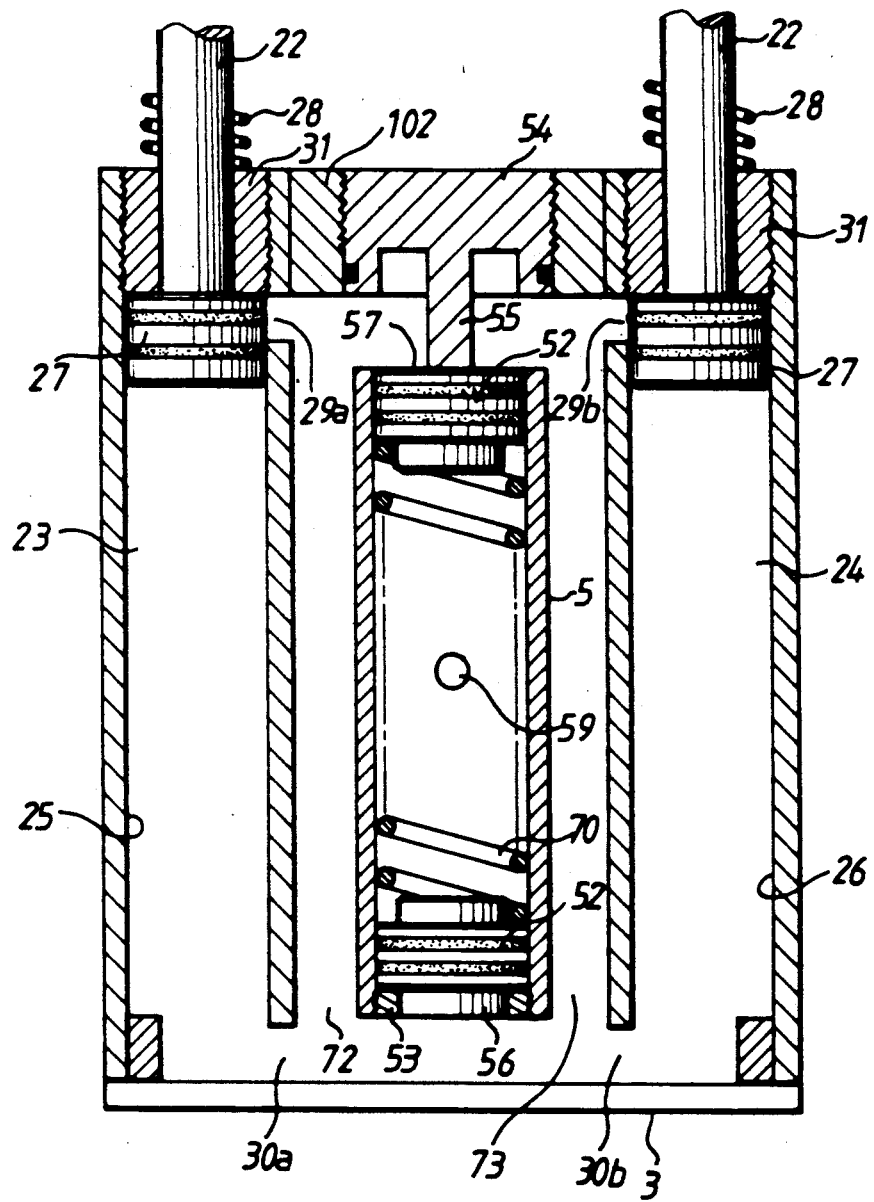

Referring to FIG. 2, the impact absorber 2 comprises a housing 3 of generally rectangular cross-section within which there are a pair of cylinders 23 and 24 parallelly arranged and spaced at a distance. Each of the cylinders 23 and 24 contains a piston 27 reciprocatable longitudinally through the cylinder and sealed to the inner cylinder wall by an conventional O-ring (not shown).

A piston rod 22 is attached to the side of piston 27 of each of the cylinders 23 and 24 and extends along the longitudinal axis of the cylinder to the exterior of the housing 3, through the central opening of a cap 31 threaded to the upper end of the cylinder, as viewed in FIG. 2. A helical compression spring 28 is fitted around the piston rod 22 with its respective ends adapted to engage the cap 31 and bumper 100.

There are apertures 29a and 30a formed through the wall 25 of cylinder 23 facing the cylinder 24 adjacent the upper end and lower end of the cylinder 23, respectively, as viewed in FIG. 2. The diameters of the apertures 29a and 30a are the same and are smaller than that of the pair of cylinders 23 and 24. In a similar manner, apertures 29b and 29a are formed through the wall 26 of cylinder 26 adjacent the upper end and lower end of the cylinder 24, respectively.

A third cylinder 5 having the same diameter as those of the cylinders 23 and 24 is fixedly arranged between the pair of cylinders 23 and 24 in the housing 3 with its longitudinal axis parallel to those of cylinders 23 and 24 and in the same plane as that of the two cylinders 23 and 24. Cylinder 5 contains two pistons 52 reciprocatable longitudinally within this cylinder and provided with conventional O-ring (not shown) to provide fluid sealing between the pistons and the inner wall of the cylinder. Both ends of the cylinder 5 are formed with openings 56 and 57, opening 56 being provided with a ring 53 threadedly engaged in the inner wall at the lower end, and opening 57 being provided at its center with a shank 55 integrally extended from a cap 54 threadedly engaged in the frame 102. A coil spring 70 is mounted between the two pistons 52 and engages them at its two ends, respectively, such that the two pistons 52 are urged by the coil spring 70 to bear against ring 53 and shank 55 of the cap 54, respectively. Further, an aperture 59 is formed at the middle portion of the cylinder 5 through the wall of cylinder 5 and the housing 3.

As seen from FIG. 2, there is a gap 72 defined by the walls of cylinder 23, cylinder 5 and housing 3. This gap 72 communicates with the internal space of the cylinder 23 through the apertures 29a and 30a and with the internal space of the cylinder 5 through the openings 56 and 57. Similarly, a gap 73 is formed between the cylinder 24 and cylinder 5. This gap 73 communicates with the internal space of the cylinder 24 through the apertures 29b and 30b and with the internal space of the cylinder 5 through the openings 56 and 57. All the cylinders 23 and 24 and gaps 72 and 73 contain damping fluid such as oil to a required level, about 80 per cent of the total space in the cylinders 23 and 24 and gaps 72 and 73.

The operation of the impact absorber 2 of this invention is as follows: The rest position of the impact absorber 2 is illustrated in FIG. 2. An impact force upon the bumper 100 causes the piston rods 22 to move downwardly within the cylinders 23 and 24 and the springs 28 are compressed. As a result of such movement, the volume of the cylinders below the pistons 27 are decreased and the pressure therein is increased. The damping liquid below the pistons 27 is thus expelled into the gaps 72 and 73 through the apertures 30a and 30b. The damping liquid squeezed from the space below pistons 27 into the gaps 72 and 73 through the apertures 30a and 30b is further expelled into the space above the pistons 27 through apertures 29a and 29b. As the pistons rods 22 extend further into the cylinders 23 and 24, the space within the cylinders 23 and 24 becomes increasingly occupied by the piston rods 22. Meanwhile, the pressure of the damping liquid on the pistons 52 also causes the pistons 52 to move toward the middle portion of the cylinder 5 against the coil spring 70 thereby enabling further damping liquid in the gaps 72 and 73 to flow through openings 56 and 57 of the cylinder 5 into the internal space of the cylinder 5. The air trapped between two pistons 52 escapes through aperture 59 to the atmosphere once the pistons 52 move toward each other.

As described above, the impact absorber 2 continuously absorbs the impact acted thereupon by the flow of compressed damping liquid and compression of spring. After absorption of the impact force, the compressed spring 70 causes the pistons 52 to move back to the initial position thereby expelling the damping liquid from the internal space of the cylinder 5 into gaps 72 and 73 through the openings 56 and 57, and the compressed springs 22 cause the pistons 27 to move back to the initial position thereby expelling the damping liquid from the internal space of the cylinders 23 and 24 above the pistons 27 into gaps 72 and 73 through the apertures 29a and 29b and allowing the damping liquid in the gaps to flow back into the internal space of cylinders 23 and 24 below the pistons 27 through the apertures 30a and 30b, whereby the bumper 100 moves back to its initial position, as shown in FIGS. 1 and 2, such that the impact absorber 2 may dampen successive impact forces.

It will be understood that the embodiment of the invention illustrated and described herein is given by way of illustration and not of limitation, and that modifications or equivalents or alernatives within the scope of the invention may suggest themselves to those skilled in the art.

What is claimed is:

1. An impact absorber comprising:
   a housing;
   a pair of cylinders arranged in said housing and having a closure at one end thereof and a closed end, a piston arranged in each of the pair of cylinders for relative sliding movement within each of the pair of cylinders, a piston rod connected to the piston and extending through the cylinder closure to the exterior of the cylinder and said housing; and
   a third cylinder provided with an opening at each of its ends, two pistons arranged for relative sliding movement within the third cylinder, spring means arranged axially between the two pistons in the third cylinder, the spring means having one end engaged with one of the two pistons and the other end engaged with the other of the two pistons, characterized in that
   said pair of cylinders are parallel and separated from each other, a first aperture formed through the walls of each of said pair of cylinders facing each other adjacent said closure end, a second aperture formed through the walls of each of said pair of cylinders facing each other adjacent said closed end,
   said third cylinder being parallelly arranged between said pair of cylinders such that a first gap is defined by the walls of one of said pair of cylinders, said third cylinder and said housing, and a second gap is defined by the walls of the other of said pair of cylinders, said third cylinder and said housing, said first gap and second gap each communicating with said third cylinder through said openings, with said pair of cylinders through said first aperture and said second aperture of said pair of cylinders.

2. An impact absorber as claimed in claim 1, wherein said pair of cylinders and said third cylinder have same diameter.

3. An impact absorber as claimed in claim 1, wherein a stopper is provided at each of said openings of said third cylinder for preventing said two pistons from sliding out of said third cylinder, and an aperture is formed through the walls of said third cylinder and said housing at the middle portion of said third cylinder.

* * * * *